(12) United States Patent
Yamashita et al.

(10) Patent No.: US 12,134,584 B2
(45) Date of Patent: Nov. 5, 2024

(54) COATING LAYER-ATTACHED CONTINUOUS CERAMIC FIBER AND METHOD FOR PRODUCING SAME, AND CERAMIC MATRIX COMPOSITE MATERIAL AND METHOD FOR PRODUCING SAME

(71) Applicant: TOSOH CORPORATION, Yamaguchi (JP)

(72) Inventors: Isao Yamashita, Ayase (JP); Yushi Nawata, Ayase (JP)

(73) Assignee: TOSOH CORPORATION, Yamaguchi (JP)

( * ) Notice: Subject to any disclaimer, the term of this patent is extended or adjusted under 35 U.S.C. 154(b) by 400 days.

(21) Appl. No.: 17/442,544

(22) PCT Filed: Mar. 24, 2020

(86) PCT No.: PCT/JP2020/013099
§ 371 (c)(1),
(2) Date: Sep. 23, 2021

(87) PCT Pub. No.: WO2020/203484
PCT Pub. Date: Oct. 8, 2020

(65) Prior Publication Data
US 2022/0185742 A1   Jun. 16, 2022

(30) Foreign Application Priority Data

Mar. 29, 2019   (JP) ................................. 2019-067596
Feb. 6, 2020   (JP) ................................. 2020-018724

(51) Int. Cl.
*C04B 41/84*   (2006.01)

(52) U.S. Cl.
CPC ...... *C04B 41/84* (2013.01); *C04B 2235/3217* (2013.01); *C04B 2235/3463* (2013.01)

(58) Field of Classification Search
None
See application file for complete search history.

(56) References Cited

U.S. PATENT DOCUMENTS

| 5,176,941 A | 1/1993 | Peuckert et al. |
| 5,190,820 A | 3/1993 | Millard et al. |

(Continued)

FOREIGN PATENT DOCUMENTS

| CN | 103910532 A | 7/2014 |
| EP | 3556740 A1 | 10/2019 |

(Continued)

OTHER PUBLICATIONS

Parlier et al., "Potential and Persceptives for Oxide/Oxide Composites", High Temperature Materials, Journal Aerospace Lab Issue Nov. 3, 2011, pp. 1-12.

(Continued)

*Primary Examiner* — Daniel J. Schleis
(74) *Attorney, Agent, or Firm* — Squire Patton Boggs (US) LLP

(57) ABSTRACT

Disclosed is a coating layer-bonded continuous ceramic fiber formed from a continuous ceramic fiber having a coating layer of a metal compound with a thickness of 50 nm or less on the surface. Also disclosed is a ceramic matrix composite material having the above-described coating layer-bonded continuous ceramic fiber.

8 Claims, 11 Drawing Sheets

(56) References Cited

U.S. PATENT DOCUMENTS

| | | | |
|---|---|---|---|
| 5,316,797 A | 5/1994 | Hazlebeck et al. | |
| 6,139,916 A | 10/2000 | Saruhan-Brings et al. | |
| 2016/0376201 A1 | 12/2016 | Aonuma | |

FOREIGN PATENT DOCUMENTS

| | | | |
|---|---|---|---|
| GB | 2467928 A | | 8/2010 |
| JP | H1-127633 A | | 5/1989 |
| JP | H01127633 A | * | 5/1989 |
| JP | H2-188471 A | | 7/1990 |
| JP | H03-185179 A | | 8/1991 |
| JP | H5-043364 A | | 2/1993 |
| JP | H7-041371 A | | 2/1995 |
| JP | H0741371 A | * | 2/1995 |
| JP | H11-049570 A | | 2/1999 |
| JP | 2002-173376 A | | 6/2002 |
| WO | WO 2016/043743 A1 | | 3/2016 |

OTHER PUBLICATIONS

Translation of International Search Report and Written Opinion for PCT International Patent Application No. PCT/JP2020/013099, dated Jun. 16, 2020, 7 pages.

Extended European Search Report dated Nov. 23, 2022 for European Patent Application No. 20784868.0, 9 pages.

\* cited by examiner

Fig.5
(a)
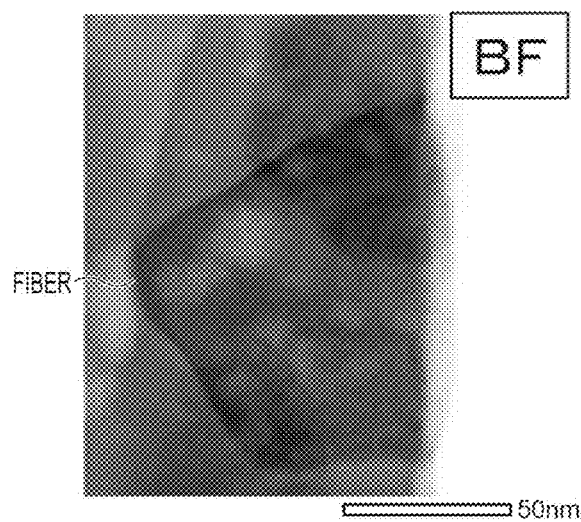
(b)
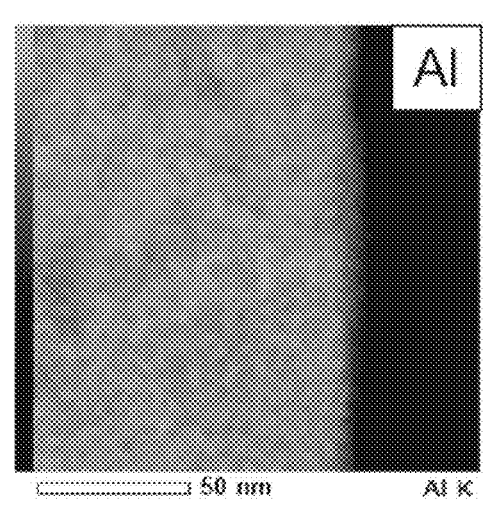
(c)
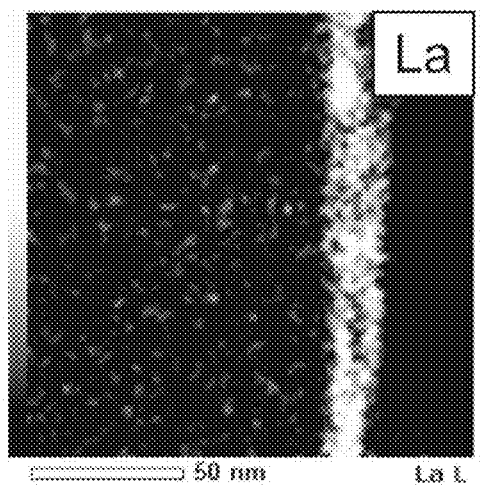
(d)
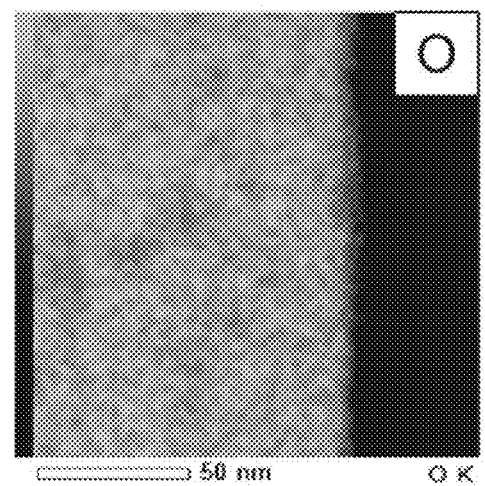

COATING LAYER-ATTACHED CONTINUOUS CERAMIC FIBER AND METHOD FOR PRODUCING SAME, AND CERAMIC MATRIX COMPOSITE MATERIAL AND METHOD FOR PRODUCING SAME

CROSS-REFERENCE TO RELATED APPLICATIONS

This application is a National Stage filing under 35 U.S.C. § 371 of International Patent Application No. PCT/JP2020/013099, filed Mar. 24, 2020, which claims the benefit of priority to JP Application No. 2020-018724, filed Feb. 6, 2020, and further claims the benefit of priority to JP Application No. 2019-067596, filed Mar. 29, 2019, these applications are incorporated herein by reference in their entirety for all purposes.

TECHNICAL FIELD

The present invention relates to a coating layer-bonded continuous ceramic fiber, a method for producing the fiber, a ceramic matrix composite material, and a method for producing the composite material.

BACKGROUND ART

Ceramic matrix composite materials (hereinafter, also referred to as "CMC") obtained by compositing continuous ceramic fibers and a ceramic matrix have resistance to fracture of the entire material due to crack growth (damage tolerance) as compared to conventional ceramics, and therefore, an investigation has been conducted to use the ceramic matrix composite materials as substitute materials for heat-resistant metals such as Ni-based alloys.

In addition, since alumina and mullite-based oxides have high chemical stability, CMCs obtained by producing alumina and mullite-based oxides into continuous ceramic fibers and compositing the continuous ceramic fibers with ceramic matrices, are expected to be utilized particularly as members intended for jet engines for aviation (for example, Non Patent Literature 1).

The damage tolerance of CMCs is attributed to the suppression of crack growth by selective detachment or fracture of the interface between the continuous ceramic fibers and the ceramic matrix. Therefore, when the continuous ceramic fibers and the ceramic matrix adhere strongly to each other, crack growth cannot be suppressed, and the material tends to be easily broken.

In order to prevent adhesion between the continuous ceramic fibers and the ceramic matrix, investigations have been conducted to coat the surface of the continuous ceramic fibers with a compound that promotes fracture of the interface or the like. However, when coating is performed by physical vapor deposition methods such as sputtering and ion plating, only the fiber surface is likely to be coated. Therefore, chemical vapor deposition methods (CVD methods), coating methods of using solutions have been studied, and for example, coating methods such as a CVD method of using boron nitride and a coating method of using a zirconia nanoparticle solution (slurry of $ZrO_2$) have been investigated so far (for example, Patent Literatures 1 and 2).

CITATION LIST

Patent Literature

Patent Literature 1: JP No. H11-049570
Patent Literature 2: JP No. 2002-173376

Non Patent Literature

Non Patent Literature 1: J. AerospaceLab, Issue 3 (2011) 1-12.

SUMMARY OF INVENTION

Technical Problem

Generally, when a CMC is produced, fibers in a state in which two or more fibers, such as a unit of several hundred fibers, are assembled (hereinafter, also referred to as "fiber bundle") are used as the continuous ceramic fibers. However, in the CVD method described in Patent Literature 1, the inside of the fiber bundle is not easily coated (the continuous fibers in the inside are not easily coated), and the strength of the CMC thus obtainable is likely to be lowered. Furthermore, in the method described in Patent Literature 2, it is difficult to control the film thickness, and also, the continuous fibers are likely to aggregate with each other. As a result, the strength of the CMC thus obtainable is likely to be lowered.

The present invention was achieved in view of such circumstances, and it is a main object of the present invention to provide a coating layer-bonded continuous ceramic fiber suitable for the production of a ceramic matrix composite material whose damage tolerance can be improved, and a ceramic matrix composite material that uses this coating layer-bonded continuous ceramic fiber.

Solution to Problem

The present inventors conducted a thorough investigation in order to solve the above-described problems, and as a result, the present inventors found that the damage tolerance of a CMC can be improved by using a coating layer and a coating layer-bonded continuous ceramic fiber having its coating layer in a controlled state, thus completing the present invention.

That is, the present invention provides a coating layer-bonded continuous ceramic fiber disclosed in [1] to [4], a ceramic matrix composite material disclosed in [5] and [6], a method for producing a coating layer-bonded continuous ceramic fiber disclosed in [7], and a method for producing a ceramic matrix composite material disclosed in [8].

[1] A coating layer-bonded continuous ceramic fiber formed from a continuous ceramic fiber having a coating layer of a metal compound with a thickness of 50 nm or less on the surface.

[2] The coating layer-bonded continuous ceramic fiber according to [1], wherein the metal compound is at least any one of a zirconium compound and a lanthanum compound.

[3] The coating layer-bonded continuous ceramic fiber according to [1] or [2], wherein the metal compound is zirconia or lanthanum oxide.

[4] The coating layer-bonded continuous ceramic fiber according to any one of [1] to [3], wherein the continuous ceramic fiber is at least any one of a continuous alumina fiber and a continuous mullite fiber.

[5] A ceramic matrix composite material having the coating layer-bonded continuous ceramic fiber according to any one of [1] to [4].

[6] The ceramic matrix composite material according to [5], wherein an interfacial strength is 10 MPa or less.

[7] A method for producing the coating layer-bonded continuous ceramic fiber according to any one of [1] to [4], the method including: impregnating continuous ceramic fibers with a solution including a metal acetylacetonate complex; and heat-treating the continuous ceramic fibers after impregnation.

[8] A method for producing a ceramic matrix composite material, the method including compositing the coating layer-bonded continuous ceramic fiber according to any one of [1] to [4] with a ceramic matrix.

Advantageous Effects of Invention

According to the present invention, at least any one of a coating layer-bonded continuous ceramic fiber suitable for the production of a ceramic matrix composite material whose damage tolerance can be improved, a ceramic matrix composite material that uses this ceramic continuous fiber, a method for producing a coating layer-bonded continuous ceramic fiber, and a method for producing a ceramic matrix composite material can be provided.

BRIEF DESCRIPTION OF DRAWINGS

FIG. 5(a) is an image of a lanthanum oxide-coated continuous alumina fiber of Example A3 captured by TEM. FIG. 5(b) is an image showing the distribution of aluminum in the lanthanum oxide-coated continuous alumina fiber of FIG. 5(a) obtained by EDS. FIG. 5(c) is an image showing the distribution of lanthanum in the lanthanum oxide-coated continuous alumina fiber of FIG. 5(a) obtained by EDS. FIG. 5(d) is an image showing the distribution of oxygen in the lanthanum oxide-coated continuous alumina fiber of FIG. 5(a) obtained by EDS.

DESCRIPTION OF EMBODIMENTS

Figure 1:
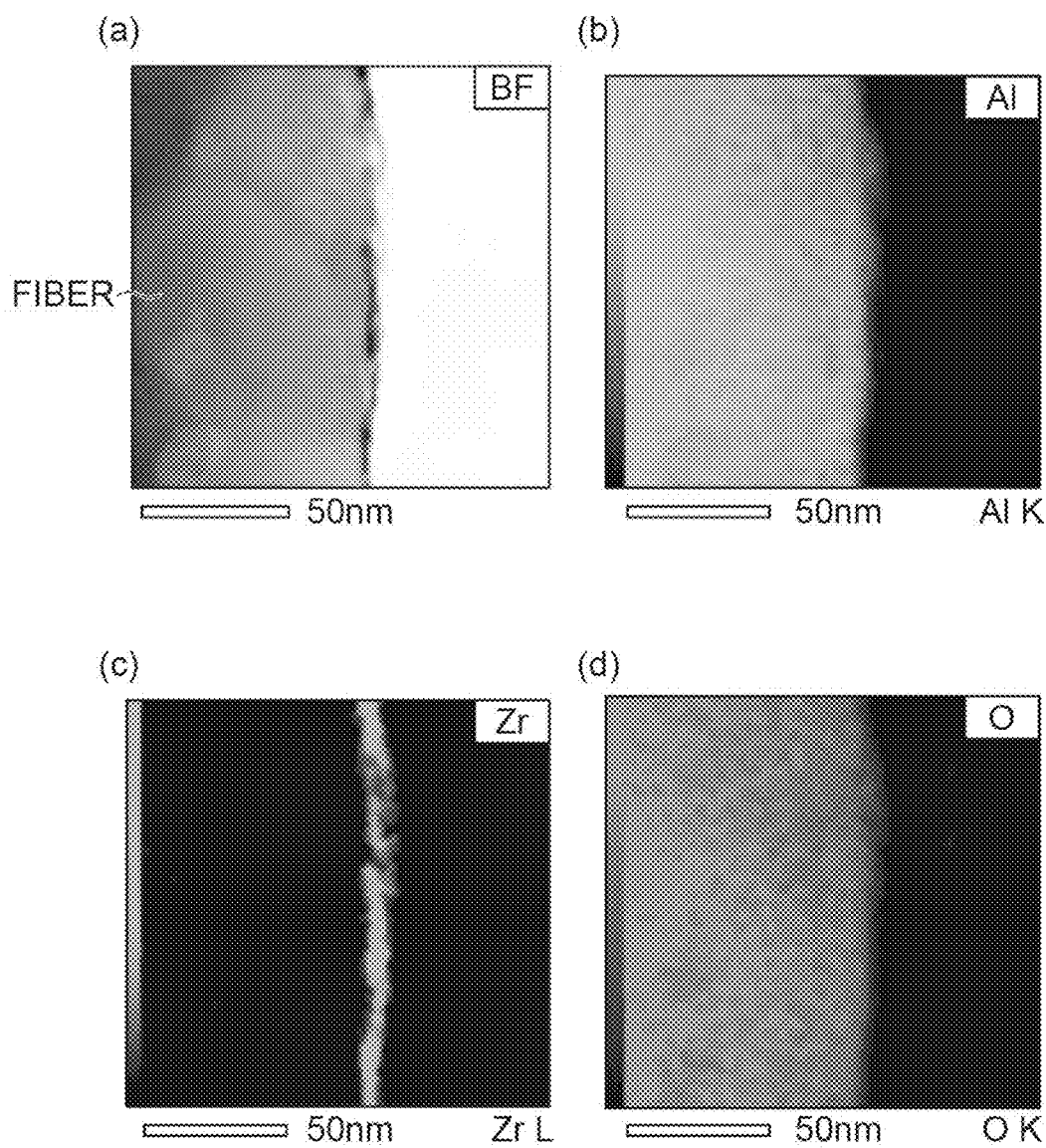
FIG. 1(a) is an image of a zirconia-coated continuous alumina fiber of Example A1 captured by a transmission electron microscope (hereinafter, also referred to as "TEM").
FIG. 1(b) is an image showing the distribution of aluminum in the zirconia-coated continuous alumina fiber of FIG. 1(a) obtained by energy dispersive X-ray spectroscopy (hereinafter, also referred to as "EDS").
FIG. 1(c) is an image showing the distribution of zirconium in the zirconia-coated continuous alumina fiber of FIG. 1(a) obtained by EDS.
FIG. 1(d) is an image showing the distribution of oxygen in the zirconia-coated continuous alumina fiber of FIG. 1(a) obtained by EDS.

Hereinafter, embodiments of the present invention will be described in detail. However, the present invention is not intended to be limited to the following embodiments.

[Coating Layer-Bonded Continuous Ceramic Fiber]

A coating layer-bonded continuous ceramic fiber of an embodiment is formed from a continuous ceramic fiber having a coating layer of a metal compound with a thickness of 50 nm or less on the surface. It can be said that the coating layer-bonded continuous ceramic fiber of the present embodiment includes a continuous ceramic fiber; and a coating layer of a metal compound with a thickness of 50 nm or less provided on the surface of the continuous ceramic fiber. In the present specification, the term "continuous fiber" means a long fiber and especially means a filamentous long fiber that can be woven by a spinning machine. The term "continuous ceramic fiber" means a continuous fiber formed from a ceramic. Furthermore, the term "coating layer" means a layer that covers at least a portion of the continuous fiber, and the term "coating layer of a metal compound" means a coating layer including a metal compound. Furthermore, the "coating layer-bonded continuous ceramic fiber" means a continuous ceramic fiber having a coating layer on the surface.

In the coating layer-bonded continuous ceramic fiber of the present embodiment, the thickness of the coating layer is 50 nm or less. As the thickness of the coating layer is 50 nm or less, aggregation of the continuous ceramic fibers can be prevented. The thickness of the coating layer is preferably 20 nm or less, and more preferably 10 nm or less. The lower limit of the thickness of the coating layer is not particularly limited; however, the thickness of the coating layer may be 1 nm or more. According to the present embodiment, the thickness of the coating layer means the thickness measured by means of the distribution of the metal element constituting the metal compound by a TEM-EDS analysis. For example, when the metal compound is a zirconium compound, the thickness is the thickness measured by means of the distribution of zirconium, and when the metal compound is a lanthanum compound, the thickness is the thickness measured by means of the distribution of lanthanum.

The metal compound in the coating layer is not particularly limited as long as it is a compound including a metal; however, the metal compound is preferably at least one of oxides and nitrides including metals, and more preferably an oxide including a metal. The metal compound is preferably one or more selected from the group consisting of a zirconium compound, a lanthanum compound, an yttrium compound, an iron compound, and a cerium compound; more preferably at least any one of a zirconium compound, a lanthanum compound, and an yttrium compound; and even more preferably a zirconium compound or a lanthanum compound. By having these compounds including metals as the coating layer, the coating layer-bonded continuous ceramic fiber becomes more suitable in the case of being used as CMCs. According to another embodiment, the metal compound is preferably a compound of a metal capable of forming a metal acetylacetonate complex, and more preferably a compound of a metal capable of forming a metal acetylacetonate complex, the compound of the metal not reacting with the continuous ceramic fiber and the ceramic matrix. Incidentally, according to the present specification, the term "matrix" means a parent phase to be composited, and the term "ceramic matrix" means a matrix formed from a ceramic.

Because of being suitable for the coating layer from the viewpoints of heat resistance and chemical stability, the metal compound is preferably a metal oxide, and particularly, zirconia ($ZrO_2$), lanthanum oxide ($La_2O_3$), yttrium oxide ($Y_2O_3$), iron oxide ($Fe_2O_3$), or cerium oxide ($CeO_2$) is suitable. The metal compound is more preferably zirconia ($ZrO_2$), lanthanum oxide ($La_2O_3$), or yttrium oxide ($Y_2O_3$), and even more preferably zirconia ($ZrO_2$) or lanthanum oxide ($La_2O_3$).

The continuous ceramic fiber of the present embodiment is not particularly limited as long as it is a continuous fiber formed from a ceramic. The continuous ceramic fiber may be, for example, either a continuous oxide ceramic fiber or a continuous non-oxide ceramic fiber. The continuous ceramic fiber is preferably at least any one selected from the group consisting of a continuous silicon carbide fiber, a continuous alumina fiber, and a continuous mullite fiber. The continuous ceramic fiber is more preferably at least any one of a continuous alumina fiber and a continuous mullite fiber, and even more preferably a continuous mullite fiber. Furthermore, it is preferable that the continuous ceramic fiber has a hydroxyl group on the surface.

The continuous ceramic fiber of the present embodiment is preferably in at least any one of a state of fiber bundle and a state in which fiber bundles are knitted, and a continuous ceramic fiber in a state in which fiber bundles are knitted (hereinafter, also referred to as "ceramic fiber cloth") is preferred.

The tensile strength of the coating layer-bonded continuous ceramic fiber of the present embodiment as measured according to JIS R 1657 (hereinafter, also referred to as "single fiber tensile strength") is preferably 1 GPa or more and 3 GPa or less, and more preferably 1.2 GPa or more and 2.8 GPa or less.

The coating layer-bonded continuous ceramic fiber of the present embodiment is suitable to be used as a CMC. Since the coating layer-bonded continuous ceramic fiber of the present embodiment is suitable for preventing continuous fibers from aggregating with each other, it is possible to suppress strong adhesion between the coating layer-bonded continuous ceramic fibers and the ceramic matrix. Therefore, when the coating layer-bonded continuous ceramic fiber is composited with a ceramic matrix to be used as a CMC, the coating layer-bonded continuous ceramic fiber can exhibit high damage tolerance.

[Method for Producing Coating Layer-Bonded Continuous Ceramic Fiber]

A method for producing a coating layer-bonded continuous ceramic fiber of an embodiment includes: an impregnation step of impregnating continuous ceramic fibers with a solution including a metal acetylacetonate complex; and a heat treatment step of heat-treating the continuous ceramic fibers after impregnation. When the continuous ceramic fibers are impregnated, chemical adsorption of the metal acetylacetonate to the surface of the continuous ceramic fibers is promoted. The continuous ceramic fibers to be provided for the impregnation step may be at least any one of a fiber bundle state and a ceramic fiber cloth, and a ceramic fiber cloth is preferred.

The metal acetylacetonate complex to be provided for the impregnation step is, for example, at least any one of zirconium(IV) acetylacetonate ($Zr(CH_3COCHCOCH_3)_4$), lanthanum(III) acetylacetonate dihydrate ($La(CH_3COCHCOCH_3)_3 \cdot 2H_2O$), yttrium(III) acetylacetonate n-hydrate ($Y(CH_3COCHCOCH_3)_3 \cdot nH_2O$), iron(III) acetylacetonate ($Fe(CH_3COCHCOCH_3)_3$), and cerium(III) acetylacetonate trihydrate ($Ce(CH_3COCHCOCH_3)_3 \cdot 3H_2O$); preferably at least any one of zirconium(IV) acetylacetonate ($Zr(CH_3COCHCOCH_3)_4$), lanthanum(III) acetylacetonate dihydrate ($La(CH_3COCHCOCH_3)_3 \cdot 2H_2O$), and yttrium(III) acetylacetonate n-hydrate ($Y(CH_3COCHCOCH_3)_3 \cdot nH_2O$); and more preferably at least any one of zirconium(IV) acetylacetonate ($Zr(CH_3COCHCOCH_3)_4$) and lanthanum(III) acetylacetonate dihydrate ($La(CH_3COCHCOCH_3)_3 \cdot 2H_2O$).

The solvent in the solution including a metal acetylacetonate complex is not particularly limited as long as the metal acetylacetonate complex dissolves therein without being decomposed. Preferred examples of the solvent include alcohols such as methanol, ethanol, and propanol; organic solvents such as acetone and benzene; water, and deuterated water. The solvent is preferably at least any one of water and an alcohol, and more preferably at least any one of methanol and ethanol.

Impregnation may be carried out under the conditions in which a chemical adsorption reaction of the metal acetylacetonate complex to the continuous ceramic fibers proceeds, and for example, the impregnation temperature may be lower than or equal to the boiling point of the solvent, and preferably room temperature (25±3° C.), while the impregnation time may be 30 minutes or more and 24 hours or less. Because the chemical adsorption reaction is likely to be promoted, it is preferable that the impregnation is performed while heating at a temperature lower than or equal to the boiling point of the solvent.

It is preferable that the impregnation is performed such that the proportion of the area coated with a coating material with respect to the total surface area of the continuous ceramic fibers (hereinafter, also referred to as "coating ratio") is 50% or more. Here, the term "coating material" refers to a material used for coating. When the coating ratio is 50% or more, in a case where the coating layer-bonded continuous ceramic fiber obtainable by the production method of the present embodiment is produced into a CMC, there is a tendency that strong adhesion between the coating layer-bonded continuous ceramic fibers and the ceramic matrix can be suppressed. It is preferable that the impregnation is performed such that the coating ratio is 75% or more, and preferably 90% or more. Since a coating ratio of 100% corresponds to a state in which the coating material covers the entire surface of the continuous ceramic fibers, the coating ratio becomes 100% or less.

Meanwhile, it is preferable that the continuous ceramic fiber is a continuous ceramic fiber having hydroxyl groups on the surface, and in this case, the coating ratio can be determined from the following formula.

$$\theta = 100 \times n M \times X / (S \times n OH) \quad (1)$$

wherein $\theta$ represents the coating ratio (%); S represents the total surface area ($m^2$) of the continuous ceramic fibers; nOH represents the number (units/$m^2$) of hydroxyl groups on the surface of the continuous ceramic fibers per unit volume; nM represents the number (atoms) of metal atoms of the metal acetylacetonate complex used for the impregnation treatment; and X represents the valence of the metal atom.

When continuous alumina fibers are used, the number of surface hydroxyl groups, nOH, is $12.5 \times 10^{18}$ (units/$m^2$), and when continuous mullite fibers are used, the number of surface hydroxyl groups, nOH, is $11.3 \times 10^{18}$ (units/$m^2$).

It is preferable that the continuous ceramic fiber having hydroxyl groups on the surface is at least any one of a continuous alumina fiber and a continuous mullite fiber, and more preferably a continuous mullite fiber.

The method for producing a coating layer-bonded continuous ceramic fiber of the present embodiment includes a step of heat-treating the continuous ceramic fiber obtainable after the impregnation step. By heat-treating the continuous ceramic fiber obtainable after the impregnation step, the metal acetylacetonate complex that has chemically adsorbed to the continuous ceramic fiber is decomposed to become a metal compound. The heat treatment conditions are not particularly limited, and the heat treatment temperature is preferably 500° C. or more and 1200° C. or less, and more preferably 700° C. or more and 1000° C. or less. The heat treatment atmosphere can be appropriately selected according to the metal compound constituting the coating layer. For example, when an oxide is used as the metal compound, the heat treatment atmosphere is an oxidizing atmosphere, and preferably an air atmosphere, and when the metal oxide is changed to a nitride, a nitrogen atmosphere is preferable.

With regard to the method for producing a coating layer-attached continuous ceramic fiber of the present embodiment, it is preferable that the impregnation step and the heat treatment step are alternately repeated two or more times (after the first heat treatment step, carrying out the second impregnation and heat treatment step), and it is more preferable that the impregnation step and the heat treatment step are alternately repeated two times or more and five times or less.

[Ceramic Matrix Composite Material (CMC)]

The ceramic matrix composite material according to an embodiment is a material having the above-mentioned coating layer-bonded continuous ceramic fibers, and preferably a material in which the above-mentioned coating layer-bonded continuous ceramic fibers and a ceramic matrix are composited.

The ceramic matrix is at least any one of an oxide ceramic and a non-oxide ceramic, and the ceramic matrix is preferably an oxide ceramic, more preferably at least any one of alumina and mullite, and even more preferably alumina and mullite. Furthermore, a material in which the ceramic matrix and the continuous ceramic fiber are of the same material.

The interfacial strength of the ceramic matrix composite material of the present embodiment is preferably 10 MPa or less, more preferably 1 MPa or more and 10 MPa or less, and even more preferably from 3 MPa or more and 8 MPa or less. When the interfacial strength is 10 MPa or less, the interface between the coating layer-bonded continuous ceramic fibers and the ceramic matrix is more easily fractured, while fracture of the entire material is not likely to occur, and when the interfacial strength is 1 MPa or more, the interface has more appropriate strength.

According to the present embodiment, regarding the interfacial strength, a cylindrical-shaped ceramic having a size of 2 mm in diameter×3.4 mm in length instead of the continuous ceramic fiber is used, a CMC produced by a method similar to that used for the CMC of the present embodiment using the above-mentioned ceramic is used as a measurement sample, and the interfacial strength can be measured according to a push-out method of the measurement sample With regard to the push-out method, reference can be made to Composites: Part A 32 (2001) 575-584. The tensile strength (hereinafter, also referred to as "bulk tensile strength") of the CMC may be 50 MPa or more and 300 MPa or less, and is preferably from 50 MPa or more and 280 MPa or less.

The bulk tensile strength can be measured using a plate-shaped measurement sample having a size of 10 mm in width×100 mm in length×5.0 mm in thickness, by pulling this measurement sample at a loading rate of 0.5 mm/min.

The content of the coating layer-bonded continuous ceramic fiber in the CMC is preferably 10% by volume or more and 90% by volume or less, and more preferably 20% by volume or more and 70% by volume or less, based on the total volume of the ceramic matrix composite material (CMC).

[Method for Producing Ceramic Matrix Composite Material (CMC)]

A method for producing a ceramic matrix composite material of an embodiment includes a composition step of compositing the above-mentioned coating layer-bonded continuous ceramic fiber and a ceramic matrix.

Any method may be used as the method for composition; however, as a preferable method, a method of impregnating continuous ceramic fibers with a slurry including a raw material of the ceramic matrix (hereinafter, may be referred to as "raw material slurry") and then heat-treating this resultant may be mentioned as an example. It is preferable that the impregnation step and heat treatment step are repeated two times or more, and in order to obtain an appropriate interfacial strength, it is more preferable that the steps are repeated two times or more and five times or less.

Since the ceramic matrix is likely to become dense, a method of impregnating the continuous ceramic fibers with the raw material slurry, subsequently heat-treating the resultant at a temperature lower than the sintering temperature to obtain a calcined body, further impregnating this with the raw material slurry, and sintering the sintered body after the impregnation, is more preferable.

For example, in a case where the ceramic matrix is at least any one of alumina and mullite, it is preferable that the continuous ceramic fibers are impregnated with a raw material slurry of at least any one of alumina and mullite, subsequently the resultant is heat-treated at a temperature of 600° C. or more and 1000° C. or less in air to make this as a calcined body, the calcined body is impregnated with the raw material slurry, and then the calcined body after impregnation is sintered at a temperature of 1050° C. or more and 1300° C. or less to achieve composition. Incidentally, prior to sintering, the calcined body after impregnation may be heat-treated at a temperature of 600° C. or more and 1000° C. or less in air. In this case, the impregnation and heat treatment of the calcined body may be repeated two times or more, and it is preferable to repeat the impregnation and heat treatment from two times to five times.

Regarding the raw material slurry of at least any one of alumina and mullite, a slurry including at least any one selected from the group consisting of alumina, aluminum hydroxide, aluminum nitrate, polyaluminum chloride, and mullite may be mentioned. In the case of performing impregnation several times, the compositions of the raw material slurry may differ.

EXAMPLES

Hereinafter, the present invention will be described using Examples. However, the present invention is not intended to be limited to these Examples.

Example A1

(Production of Zirconia-Coated Continuous Alumina Fiber)
3.5 g of zirconium(IV) acetylacetonate (Zr(CH$_3$COCHCOCH$_3$)$_4$) was dissolved in 350 mL of ethanol to prepare an impregnating liquid. Continuous alumina fibers that had been subjected to desizing at 700° C. in air (alumina fiber cloth, manufactured by 3M Japan, Ltd., trade name: NEXTEL 610) were introduced into the impregnating liquid and were impregnated for 24 hours at room temperature. Meanwhile, the total surface area of the continuous alumina fibers was 6.2 m$^2$, and the coating ratio of the surface hydroxyl groups of the continuous alumina fibers was adjusted to be 100% by adjusting the amount of zirconium(IV) acetylacetonate to be a large excess with respect to the coating ratio determined by the above-described Formula (1) (100% coating ratio: 0.0158 g). Subsequently, the continuous alumina fibers were taken out from the impregnating liquid and were heated at normal pressure in air at 900° C. for 2 hours. By repeating such impregnation step and heat treatment step three times, zirconia-coated continuous alumina fibers were obtained.

Images of the surface of a zirconia-coated continuous alumina fiber thus obtained were captured by TEM. FIG. 1(a) is an image of a zirconia-coated continuous alumina fiber of Example A1 captured by TEM. FIG. 1(b) is an image showing the distribution of aluminum in the zirconia-coated continuous alumina fiber of FIG. 1(a) obtained by EDS. FIG. 1(c) is an image showing the distribution of zirconium in the zirconia-coated continuous alumina fiber of FIG. 1(a) obtained by EDS. FIG. 1(d) is an image showing the distribution of oxygen in the zirconia-coated continuous alumina fiber of FIG. 1(a) obtained by EDS. As shown in FIG. 1(c), it was verified that in the zirconia-coated continuous alumina fiber of Example A1, a coating layer including zirconium and having a thickness of 3 to 5 nm was formed on the surface of a continuous alumina fiber. Furthermore, as shown in FIG. 1(d), since oxygen was detected in the coating layer, it was verified that the coating layer was formed from zirconia (ZrO$_2$), which is an oxide. That is, it was verified that a coating layer of zirconia having a thickness of 3 to 5 nm was formed on the surface of the continuous alumina fiber.

(ESCA Analysis)
The zirconia-coated continuous alumina fiber was subjected to an ESCA analysis in the depth direction of the continuous alumina fiber under the following conditions, using a multifunctional scanning X-ray photoelectron spectroscopy analyzer (apparatus name: PHI5000 VersaProbe II, manufactured by ULVAC-PHI, Inc.).

Figure 2:
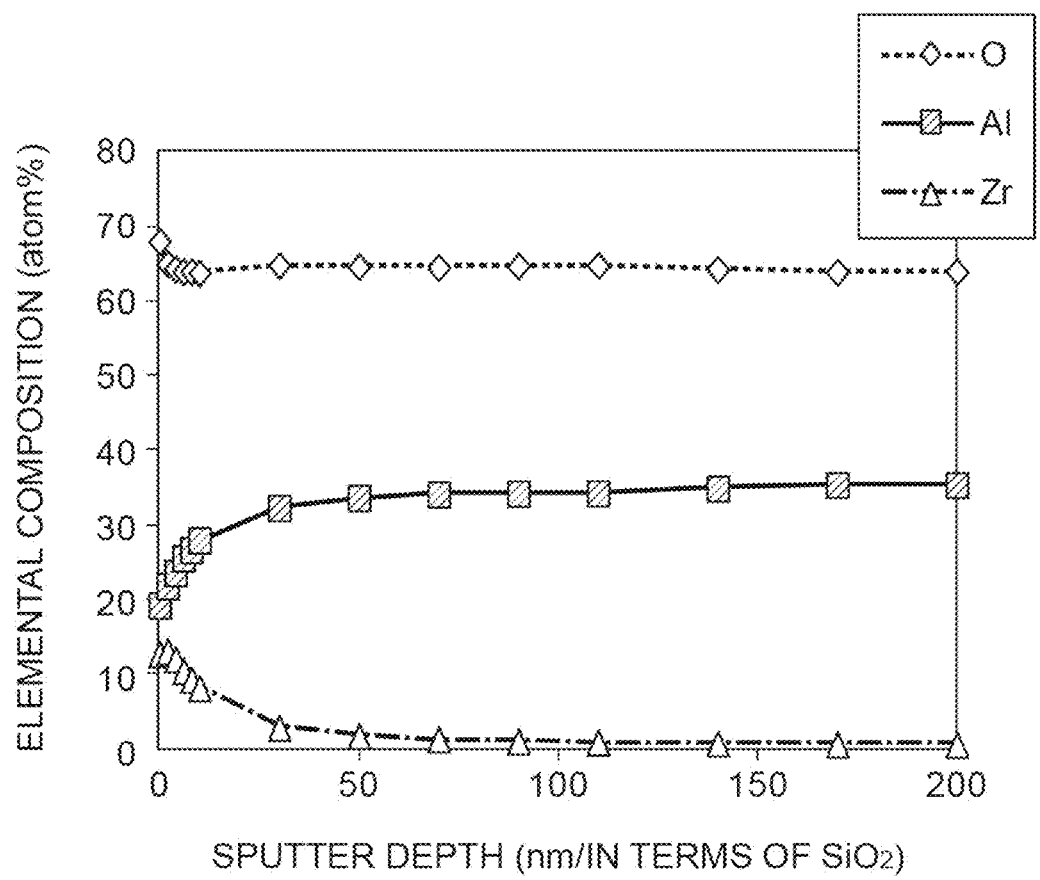
FIG. 2 is a graph showing the analysis results of an X-ray photoelectron spectroscopy (hereinafter, also referred to as "ESCA") analysis of the surface of a zirconia-coated continuous alumina fiber of Example A1.

X-ray source: Monochromatic Al-Kα radiation, 25 W
Accelerating voltage: 15 kV
Irradiated current: 300 nA
Analyzed area; 100 μmφ
Sputtering conditions: Ion gun: Ar monomer ion (1 kV or 4 kV)
Sputter depth: 0 to 200 nm (in terms of SiO$_2$)
Sputter area: 2×2 mm FIG. 2 is a graph showing the analysis results of an ESCA analysis of the surface of the zirconia-coated continuous alumina fiber of Example A1. As shown in FIG. 2, it was verified that zirconium and oxygen were present in the vicinity of the surface (a depth of about 15 nm) of the continuous alumina fiber.

(Measurement of Single Fiber Tensile Strength)
The single fiber tensile strength of the zirconia-coated continuous alumina fiber thus obtained was measured according to JIS R 1657. The single fiber tensile strength of the zirconia-coated continuous alumina fiber was 2.1 GPa, and this was almost equal to the single fiber tensile strength of desizing-treated continuous alumina fiber (2.5 GPa).

Example A2

(Production of Zirconia-Coated Continuous Mullite Fiber)
3.5 g of zirconium(IV) acetylacetonate (Zr(CH$_3$COCHCOCH$_3$)$_4$) was dissolved in 350 mL of ethanol to prepare an impregnating liquid. Continuous mullite fibers that had been subjected to desizing (heat treatment at 800° C. in air) (mullite fiber cloth, manufactured by 3M Japan, Ltd., trade name: NEXTEL 720) were introduced into the impregnating liquid and were impregnated for 24 hours at room temperature. Meanwhile, the total surface area of the continuous mullite fibers was 5.5 m$^2$, and the coating ratio of the surface hydroxyl groups of the continuous mullite fibers was adjusted to be 100% by adjusting the amount of zirconium(IV) acetylacetonate to be a large excess with respect to the coating ratio determined by the above-described Formula (1) (100% coating ratio: 0.0125 g). Subsequently, the continuous mullite fibers were taken out from the impregnating liquid and were heated at normal pressure in air at 900° C. for 2 hours, and zirconia-coated continuous mullite fibers were obtained.

Figure 3:
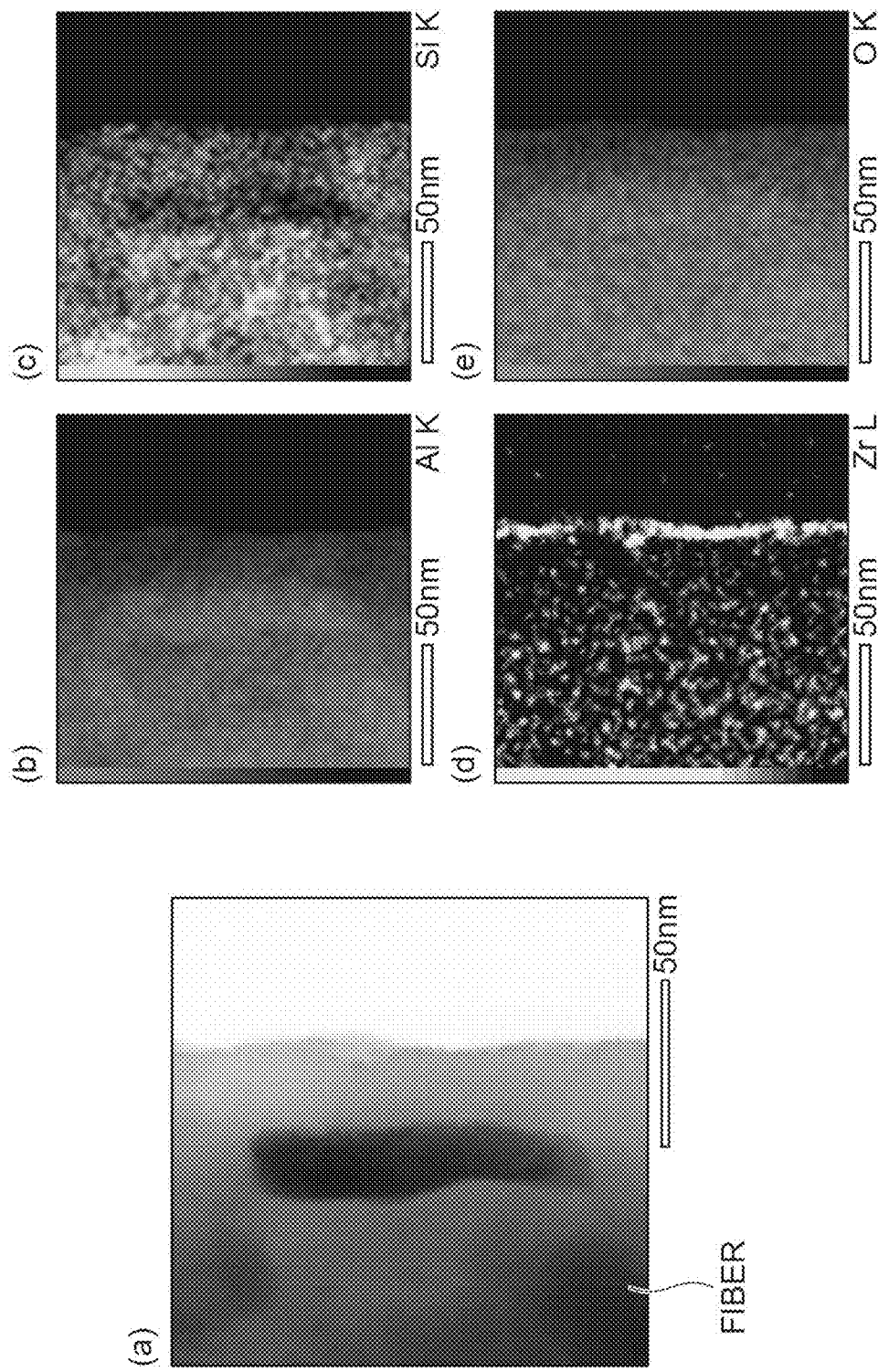
FIG. 3(a) is an image of a zirconia-coated continuous mullite fiber of Example A2 captured by TEM.
FIG. 3(b) is an image showing the distribution of aluminum in the zirconia-coated continuous mullite fiber of FIG. 3(a) obtained by EDS.
FIG. 3(c) is an image showing the distribution of silicon in the zirconia-coated continuous mullite fiber of FIG. 3(a) obtained by EDS.
FIG. 3(d) is an image showing the distribution of zirconium in the zirconia-coated continuous mullite fiber of FIG. 3(a) obtained by EDS.
FIG. 3(e) is an image showing the distribution of oxygen in the zirconia-coated continuous mullite fiber of FIG. 3(a) obtained by EDS.

Images of the surface of a zirconia-coated continuous mullite fiber thus obtained were captured by TEM. FIG. 3(a) is an image of a zirconia-coated continuous mullite fiber of Example A2 captured by TEM. FIG. 3(b) is an image showing the distribution of aluminum in the zirconia-coated continuous mullite fiber of FIG. 3(a) obtained by EDS. FIG. 3(c) is an image showing the distribution of silicon in the zirconia-coated continuous mullite fiber of FIG. 3(a) obtained by EDS. FIG. 3(d) is an image showing the distribution of zirconium in the zirconia-coated continuous mullite fiber of FIG. 3(a) obtained by EDS. FIG. 3(e) is an image showing the distribution of oxygen in the zirconia-coated continuous mullite fiber of FIG. 3(a) obtained by EDS. As shown in FIG. 3(d), it was verified that in the zirconia-coated continuous mullite fiber of Example A2, a coating layer including zirconium and having a thickness of 3 to 7 nm was formed on the surface of a continuous mullite fiber. Furthermore, as shown in FIG. 3(d), since oxygen was detected in the coating layer, it was verified that the coating layer was formed from zirconia ($ZrO_2$), which is an oxide. That is, it was verified that a coating layer of zirconia having a thickness of 3 to 7 nm was formed on the surface of the continuous mullite fiber.

(ESCA Analysis)

Figure 4:
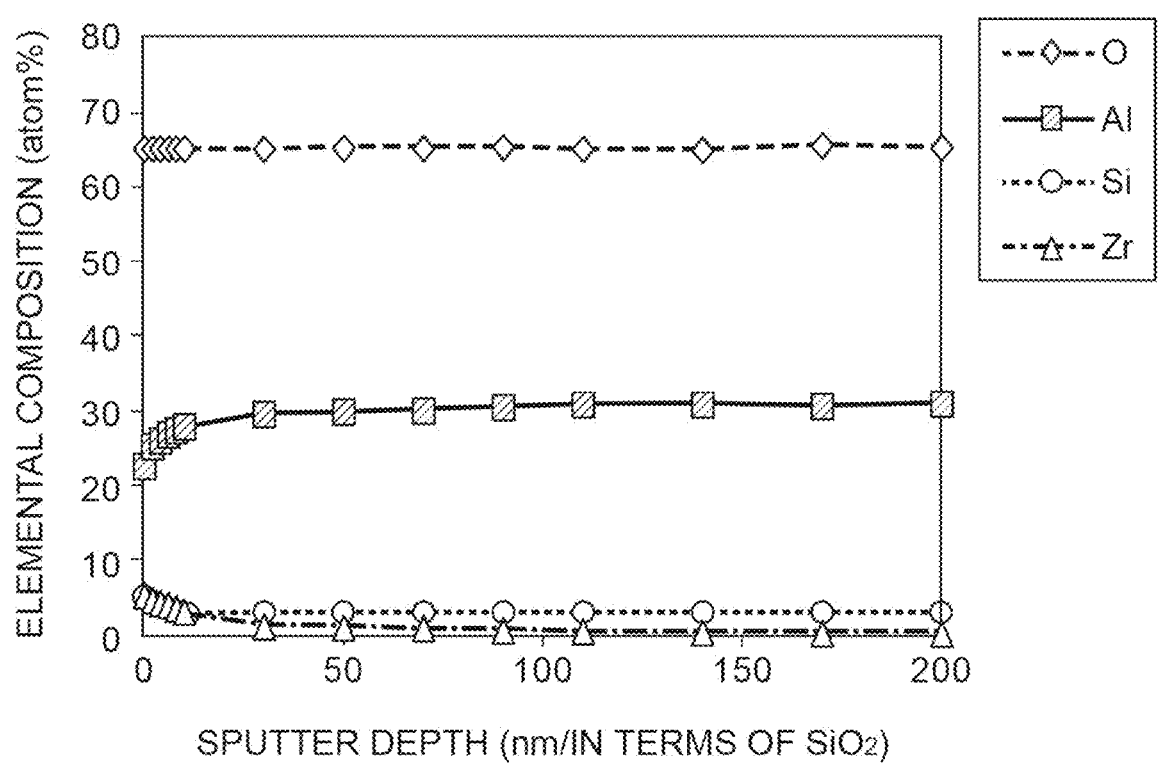
FIG. 4 is a graph showing the analysis results of an ESCA analysis of the surface of a zirconia-coated continuous mullite fiber of Example A2.

The zirconia-coated continuous mullite fiber was subjected to an ESCA analysis in the depth direction of the continuous mullite fiber under the conditions similar to those of Example A1. FIG. 4 is a graph showing the analysis results of the ESCA analysis of the surface of the zirconia-coated continuous mullite fiber of Example A2. As shown in FIG. 4, it was verified that zirconium and oxygen were present in the vicinity of the surface (a depth of about 15 nm) of the continuous mullite fiber.

(Measurement of Single Fiber Tensile Strength)

The single fiber tensile strength of the zirconia-coated continuous mullite fiber thus obtained was measured according to JIS R 1657. The single fiber tensile strength of the zirconia-coated continuous mullite fiber was 1.3 GPa, and this was almost equal to the single fiber tensile strength of desizing-treated continuous mullite fiber (1.5 GPa).

Example A3

(Production of Lanthanum Oxide-Coated Continuous Alumina Fiber)

A lanthanum oxide-coated continuous alumina fiber was obtained in the same manner as in Example A1, except that zirconium(IV) acetylacetonate was changed to lanthanum(III) acetylacetonate dihydrate ($La(CH_3COCHCOCH_3)_3 \cdot 2H_2O$). Meanwhile, the total surface area of the continuous alumina fibers was 6.2 $m^2$, and the coating ratio of the surface hydroxyl groups of the continuous alumina fibers was adjusted to be 100% by adjusting the amount of lanthanum(III) acetylacetonate to be a large excess (3.5 g) with respect to the coating ratio determined by the above-described Formula (1) (100% coating ratio: 0.0188 g).

Images of the surface of a lanthanum oxide-coated continuous alumina fiber thus obtained were captured by TEM. FIG. 5(a) is an image of a lanthanum oxide-coated continuous alumina fiber of Example A3 captured by TEM. FIG. 5(b) is an image showing the distribution of aluminum in the lanthanum oxide-coated continuous alumina fiber of FIG. 5(a) obtained by EDS. FIG. 5(c) is an image showing the distribution of lanthanum in the lanthanum oxide-coated continuous alumina fiber of FIG. 5(a) obtained by EDS. FIG. 5(d) is an image showing the distribution of oxygen in the lanthanum oxide-coated continuous alumina fiber of FIG. 5(a) obtained by EDS. As shown in FIG. 5(c), it was verified that in the lanthanum oxide-coated continuous alumina fiber of Example A3, a coating layer including lanthanum and having a thickness of 5 to 10 nm was formed on the surface of a continuous alumina fiber. Furthermore, as shown in FIG. 5(d), since oxygen was detected in the coating layer, it was verified that the coating layer was formed from lanthanum oxide ($La_2O_3$), which is an oxide. That is, it was verified that a coating layer of lanthanum oxide having a thickness of 5 to 10 nm was formed on the surface of the continuous alumina fiber.

(ESCA Analysis)

Figure 6:
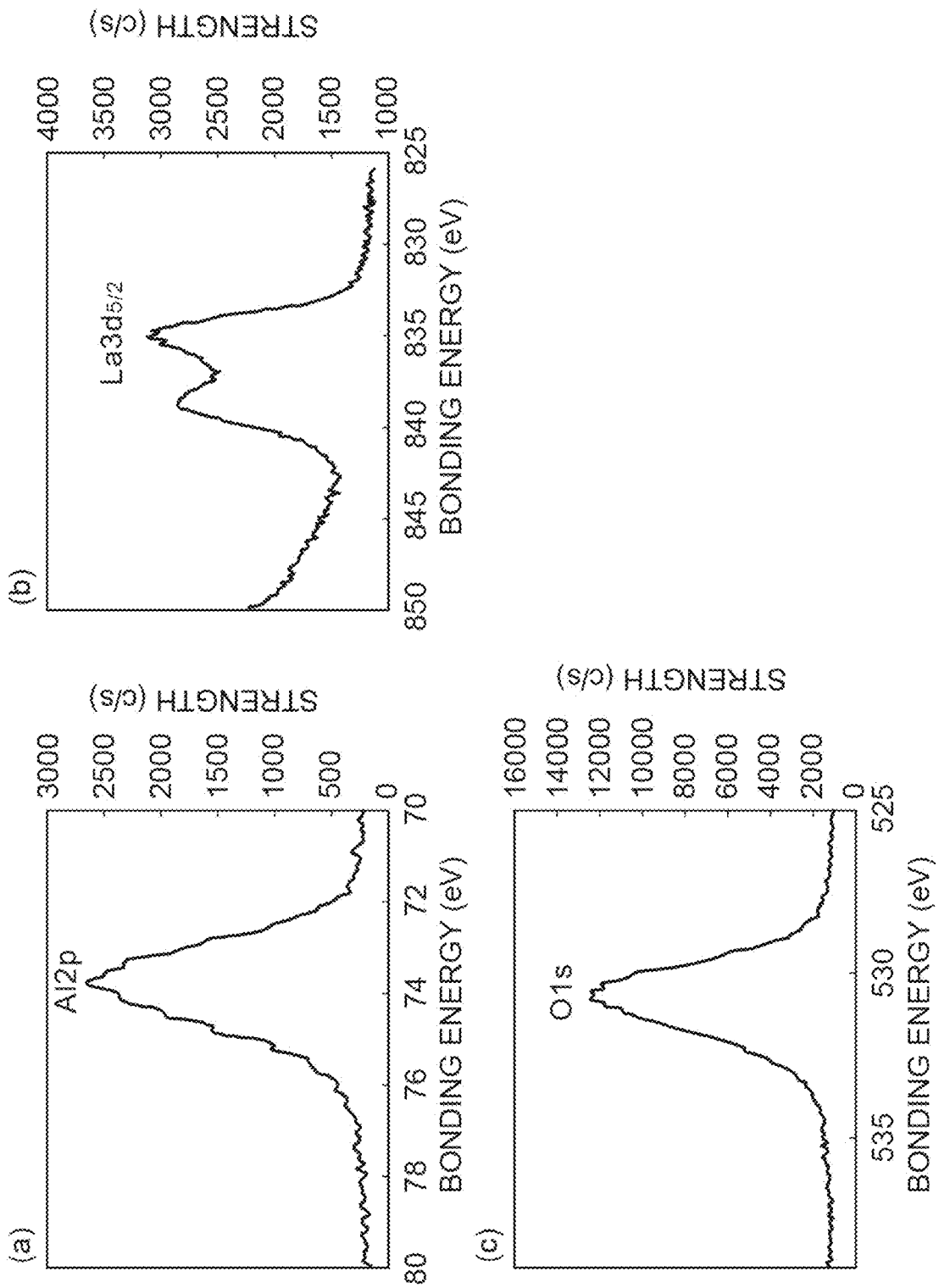
FIGS. 6(a) to 6(c) are graphs showing the analysis results of an ESCA analysis of the surface of a lanthanum oxide-coated continuous alumina fiber of Example A3.

The lanthanum oxide-coated continuous alumina fiber was subjected to an ESCA analysis of the continuous alumina fiber under the conditions similar to those of Example A1. FIGS. 6(a) to 6(c) are graphs showing the analysis results of the ESCA analysis of the surface of the lanthanum oxide-coated continuous alumina fiber of Example A3. As shown in FIGS. 6(a) to 6(c), it was verified that lanthanum and oxygen were present, in addition to aluminum originating from the fiber, in the vicinity of the surface of the continuous alumina fiber.

(Measurement of Single Fiber Tensile Strength)

The single fiber tensile strength of the lanthanum oxide-coated continuous alumina fiber thus obtained was measured according to JIS R 1657. The single fiber tensile strength of the lanthanum oxide-coated continuous alumina fiber was 2.7 GPa, and this was almost equal to the single fiber tensile strength of desizing-treated continuous alumina fiber (2.5 GPa).

Example A4

(Production of Lanthanum Oxide-Coated Continuous Mullite Fiber)

A lanthanum oxide-coated continuous mullite fiber was obtained in the same manner as in Example A2, except that zirconium(IV) acetylacetonate was changed to lanthanum(III) acetylacetonate dihydrate ($La(CH_3COCHCOCH_3)_3 \cdot 2H_2O$). Meanwhile, the total surface area of the continuous mullite fibers was 5.5 $m^2$, and the coating ratio of the surface hydroxyl groups of the continuous mullite fibers was adjusted to be 100% by adjusting the amount of lanthanum(III) acetylacetonate to be a large excess with respect to the coating ratio determined by the above-described Formula (1) (100% coating ratio: 0.0149 g).

Figure 7:
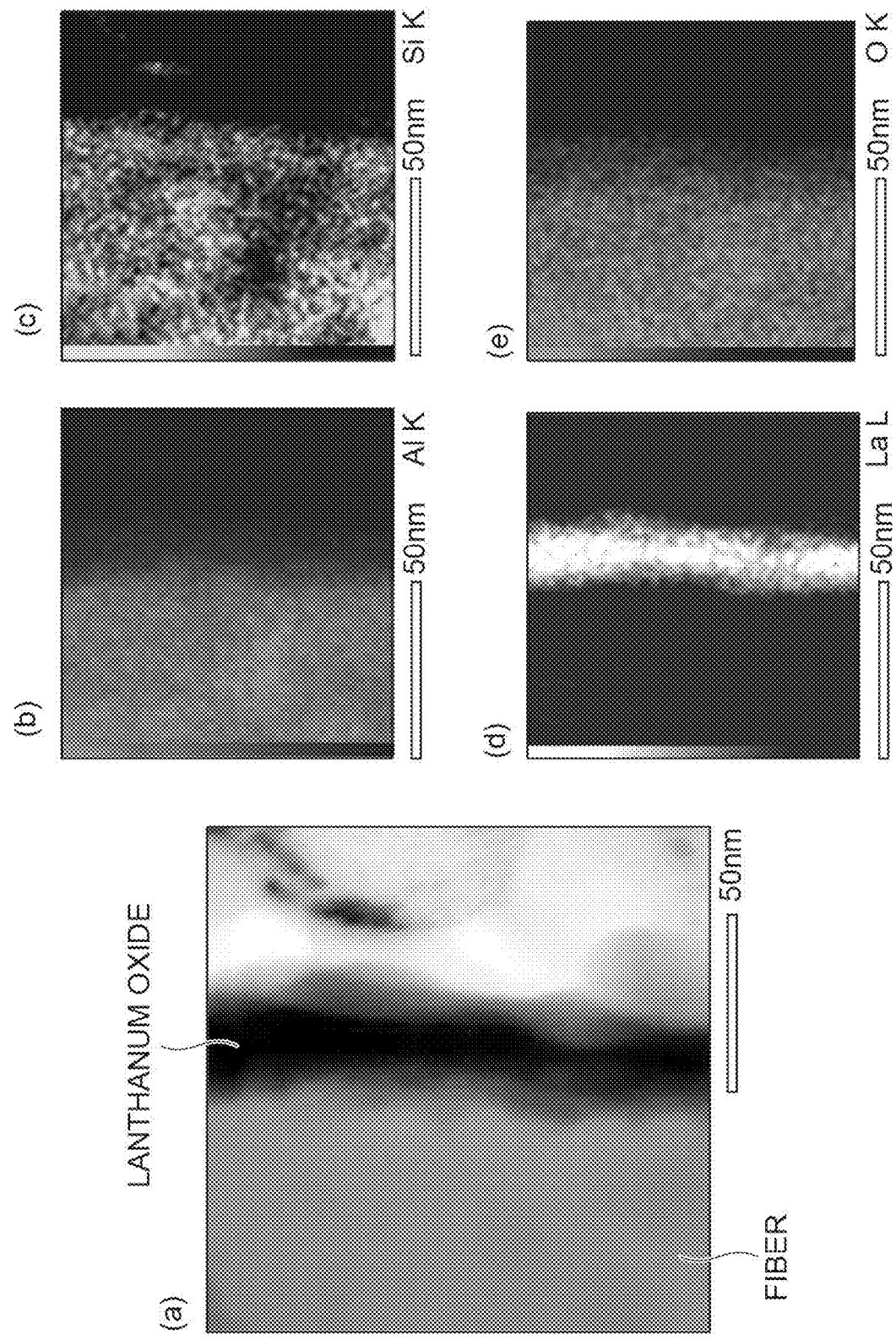
FIG. 7(a) is an image of a lanthanum oxide-coated continuous mullite fiber of Example A4 captured by TEM.
FIG. 7(b) is an image showing the distribution of aluminum in the lanthanum oxide-coated continuous mullite fiber of FIG. 7(a) obtained by EDS.
FIG. 7(c) is an image showing the distribution of silicon in the lanthanum oxide-coated continuous mullite fiber of FIG. 7(a) obtained by EDS.
FIG. 7(d) is an image showing the distribution of lanthanum in the lanthanum oxide-coated continuous mullite fiber of FIG. 7(a) obtained by EDS.
FIG. 7(e) is an image showing the distribution of oxygen in the lanthanum oxide-coated continuous mullite fiber of FIG. 7(a) obtained by EDS.
Figure 8:
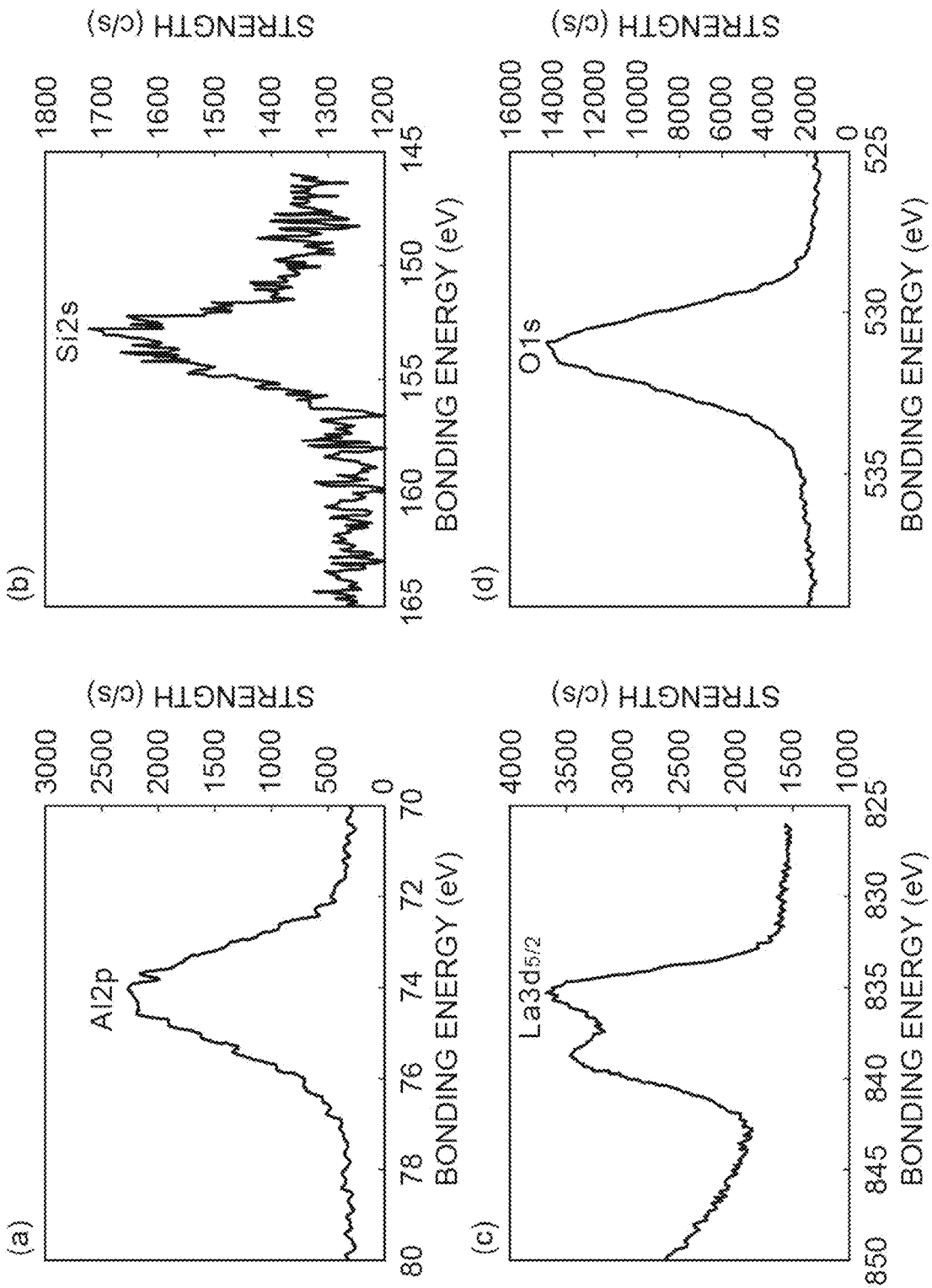
FIGS. 8(a) to 8(d) are graphs showing the analysis results of an ESCA analysis of the surface of a lanthanum oxide-coated continuous mullite fiber of Example A4.

Images of the surface of a lanthanum oxide-coated continuous mullite fiber thus obtained were captured by TEM. FIG. 7(a) is an image of a lanthanum oxide-coated continuous mullite fiber of Example A4 captured by TEM. FIG. 7(b) is an image showing the distribution of aluminum in the lanthanum oxide-coated continuous mullite fiber of FIG. 7(a) obtained by EDS. FIG. 7(c) is an image showing the distribution of silicon in the lanthanum oxide-coated continuous mullite fiber of FIG. 7(a) obtained by EDS. FIG. 7(d) is an image showing the distribution of lanthanum in the lanthanum oxide-coated continuous mullite fiber of FIG. 7(a) obtained by EDS. FIG. 7(e) is an image showing the distribution of oxygen in the lanthanum oxide-coated continuous mullite fiber of FIG. 7(a) obtained by EDS. As shown in FIG. 7(d), it was verified that in the lanthanum oxide-coated continuous mullite fiber of Example A4, a coating layer including lanthanum and having a thickness of 10 nm to 32 nm was formed on the surface of a continuous mullite fiber. Furthermore, as shown in FIG. 7(e), since oxygen was detected in the coating layer, it was verified that the coating layer was formed from lanthanum oxide ($La_2O_3$), which is an oxide. That is, it was verified that a coating layer of lanthanum oxide having a thickness of about 30 nm was formed on the surface of the continuous mullite fiber.

(ESCA Analysis)

The lanthanum oxide-coated continuous mullite fiber was subjected to an ESCA analysis of the continuous mullite fiber under the conditions similar to those of Example A1. FIGS. 8(a) to 8(d) are graphs showing the analysis results of the ESCA analysis of the surface of the lanthanum oxide-coated continuous mullite fiber of Example A4. As shown in FIGS. 8(a) to 8(d), it was verified that lanthanum and oxygen originating from lanthanum oxide were present, in addition to aluminum and silicon originating from the fiber, in the vicinity of the surface of the continuous mullite fiber.

(Measurement of Single Fiber Tensile Strength)

The single fiber tensile strength of the lanthanum oxide-coated continuous mullite fiber thus obtained was measured according to JIS R 1657. The single fiber tensile strength of the lanthanum oxide-coated continuous mullite fiber was 1.8 GPa, and this was almost equal to the single fiber tensile strength of desizing-treated continuous mullite fiber (1.5 GPa).

Comparative Example A1

Continuous alumina fibers were dipped into a zirconia nanoparticle solution (solid content 30% by mass, particle size 63 nm), and then the mixture was heated at normal pressure in air at 900° C. for 2 hours. The continuous alumina fiber that had been subjected to this process repeatedly for three times was observed by SEM. The continuous alumina fiber of Comparative Example A1 was expected to have a large particle size of zirconia in the zirconia nanoparticle solution and a thickness of the coating layer of more than 50 nm.

Figure 9:
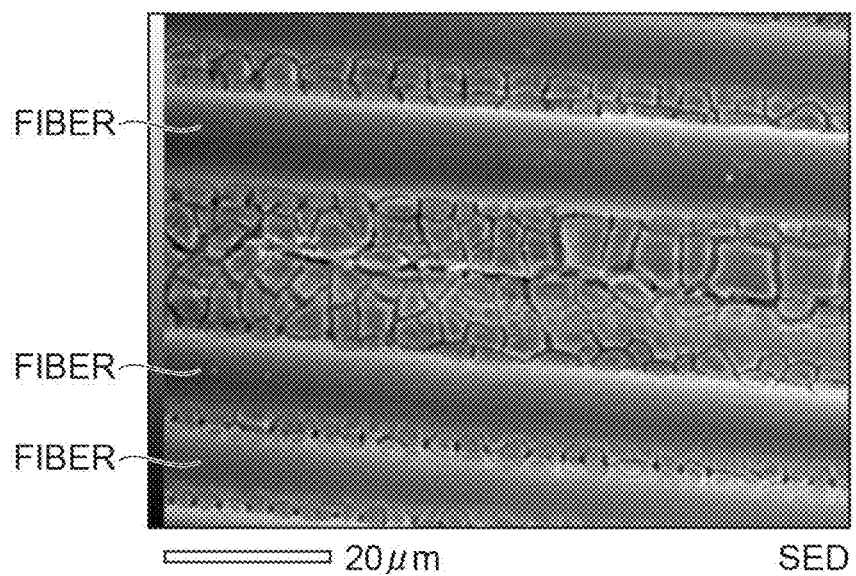
FIG. 9 is an image of a continuous alumina fiber of Comparative Example A1 captured by a scanning electron microscope (hereinafter, also referred to as "SEM").

FIG. 9 is an image of the continuous alumina fiber of Comparative Example A1 captured by SEM. As shown in FIG. 9, it was verified that the continuous alumina fiber of Comparative Example A1 was such that the continuous fibers were aggregated by zirconia particles.

Example B1

(Production of Ceramic Matrix Composite Material (CMC))

25% by mass of an approximately spherical-shaped α-alumina powder having an average particle size of 0.19 µm and 75% by mass of a mullite powder having an average particle size of 1.66 µm were mixed to obtain a raw material powder. 350 g of the raw material powder was mixed with 146 g of pure water in a ball mill, and a mixed slurry of alumina and mullite was obtained.

Next, the zirconia-coated continuous alumina fibers obtained in Example A1 were impregnated with the mixed slurry of alumina and mullite, and then the resultant was dried at a temperature of 70° C. and a relative humidity of 95% to obtain a molded body having a size of 110 mm in width×110 mm in length×about 5.0 mm in thickness. The molded body was dried in air at 120° C. for one day and night and then heat-treated in air at 900° C. for 2 hours to obtain a calcined body.

The calcined body thus obtained was impregnated with an about 10% by mass aqueous solution of polyaluminum chloride ($[Al_2(OH)_nCl_{6-n}]_m$, 1≤n≤5, m≤10, m and n are integers) and dried at room temperature, and then the resultant was heat-treated at 900° C. for 2 hours. This impregnation and heat treatment were repeated three times. After the third heat treatment, the calcined body was sintered in air at 1100° C. for 2 hours to obtain a plate-shaped CMC, which was a sintered body. The plate-shaped CMC thus obtained included 33.4% by volume of the fibers, and the density of the CMC was 2.48 g/cm³. Incidentally, the density of the CMC was measured according to the Archimedean method.

(Measurement of Bulk Tensile Strength)

The obtained CMC was processed into a size of 10 mm in width×100 mm in length×5.0 mm in thickness, and aluminum tabs were bonded to both ends to produce a tensile test specimen. The width and thickness of the tensile test specimen were measured using a micrometer, and the length of the test specimen was measured using vernier caliper. A tensile strength test was performed at a loading rate of 0.5 mm/min using a strength tester (manufactured by SHIMADZU CORPORATION, apparatus name: AG-X Plus) and tensile test jigs. The number of the test specimens for the tensile strength test was set to five, and the average value of the five specimens was designated as bulk tensile strength. The bulk tensile strength of the obtained CMC was 80 MPa.

(Measurement of Interfacial Strength)

The interfacial strength of the obtained CMC was measured by preparing an alumina rod with its surface coated using a metal acetylacetonate complex in the same manner as in the production of the coating layer-bonded continuous ceramic fiber and performing a push-out test of thrusting only the alumina rod using a strength tester (manufactured by SHIMADZU CORPORATION, apparatus name: AG-2000B).

Figure 10:
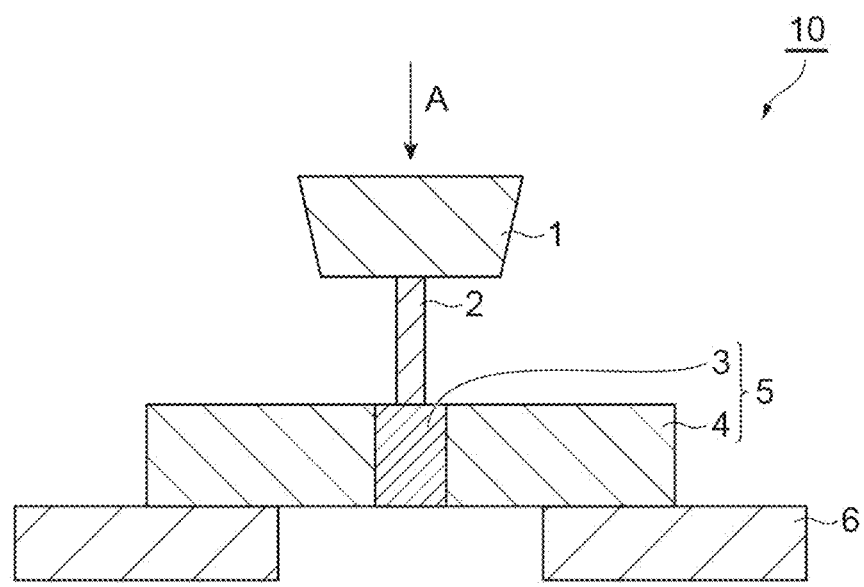
FIG. 10 is a schematic cross-sectional view illustrating an example of an interfacial strength analyzer.

FIG. 10 is a schematic cross-sectional view illustrating an example of an interfacial strength analyzer. The interfacial strength analyzer 10 shown in FIG. 10 is mainly composed of a sample for evaluation 5 formed from a surface-coated alumina rod 3 and a ceramic matrix 4; a strength tester 1 for thrusting the surface-coated alumina rod 3 in the direction A; an indenter 2 connected to the strength tester 1 for thrusting the surface-coated alumina rod 3; and a fixing base 6 for fixing the part of the ceramic matrix 4 of the sample for evaluation 5.

Regarding the measurement of the interfacial strength, first, a cylindrical-shaped alumina rod (2 mm in diameter× 3.4 mm in length) is prepared, the surface of the alumina rod (2 mm in diameter×3.4 mm in length) is coated using a metal acetylacetonate complex that is used for the production of the coating layer-bonded continuous ceramic fiber, and a surface-coated alumina rod 3 is produced. Next, the raw material powder used for the production of the CMC is prepared, the surface-coated alumina rod 3 is molded in a state of being embedded in the raw material powder, by mold pressing and a cold isostatic press molding treatment at a pressure of 200 MPa, and thus a molded body (21 mm in diameter×3.4 mm in length) with the surface-coated alumina rod 3 in a state of being embedded therein is produced. Subsequently, the molded body is treated by the same procedure as in the production of the CMC, and a sample for evaluation 5 formed from the surface-coated alumina rod 3 and a ceramic matrix 4 is obtained. Only the ceramic matrix 4 parts of the sample for evaluation 5 are fixed to the fixing base 6, the part of the surface-coated alumina rod 3 is thrust using a φ1-mm indenter 2 made of stainless steel, and a stress-strain curve at this time is determined. The interfacial strength τ is calculated by Formula (2) from the maximum load P of the stress-strain curve and the contact area between the surface-coated alumina rod 3 and the ceramic matrix 4.

$$\tau = P\max/(2\pi rl) \quad (2)$$

wherein in Formula (2), Pmax represents the maximum load of a stress-displacement curve in the push-out test; π represents the ratio of the circumference of a circle to its diameter; r represents the radius of the alumina rod; and l represents the length of the alumina rod.

That is, in this measurement of the interfacial strength, with regard to the sample for evaluation in which the surface-coated alumina rod and the ceramic matrix are composited, the interfacial strength between the surface-coated alumina and the ceramic matrix can be measured by thrusting the surface-coated alumina rod, and the interfacial strength of the CMC can be measured.

Measurement Example B1 (Measurement of Interfacial Strength)

A mixed slurry of alumina and mullite was produced by a technique similar to that of Example B1, and the mixed slurry was dried to obtain a raw material powder. Next, 0.5 g of zirconium(IV) acetylacetonate ($Zr(CH_3COCHCOCH_3)_4$) was dissolved in 50 mL of ethanol, and an alumina rod having a total surface area of 0.094 $m^2$ was impregnated with the solution at room temperature for 24 hours. At this time, the amount was adjusted to be a large excess compared to the amount of addition required to obtain a coating ratio of 100% as determined by the above-described Formula (1). Here, the coating ratio of the alumina rod was determined by the Formula (1) in the same manner as in the case of the continuous ceramic fiber (since this alumina rod is a ceramic having hydroxyl groups on the surface and is coated with a metal acetylacetonate complex (zirconium(IV) acetylacetonate), the coating ratio can be determined by the Formula (1)). Subsequently, the alumina rod was taken out and heat-treated in air at 900° C. for 2 hours. Such impregnation step and heat treatment step (hereinafter, also referred to as "surface coating treatment") were repeated three times, and thereby a zirconia-coated alumina rod was obtained.

Next, the zirconia-coated alumina rod was embedded in the raw material powder and molded by mold pressing, subsequently the molded body was treated by cold isostatic press molding at a pressure of 200 MPa, and thereby a molded body in which the zirconia-coated alumina rod was embedded in the central part of a cylinder having a diameter of 20 mm and a thickness of 4 mm was obtained. The obtained molded body was sintered in air at 900° C. for 2 hours to obtain a calcined body. The obtained calcined body was subjected to impregnation with an aqueous solution of polyaluminum chloride and a heat treatment repeatedly for three times by a procedure similar to that of Example B1, subsequently the calcined boy was sintered in air at 1100° C. for 2 hours in the same manner as in Example B1, and a sintered body in which the alumina rod and the ceramic matrix were integrally sintered was produced.

Figure 11:
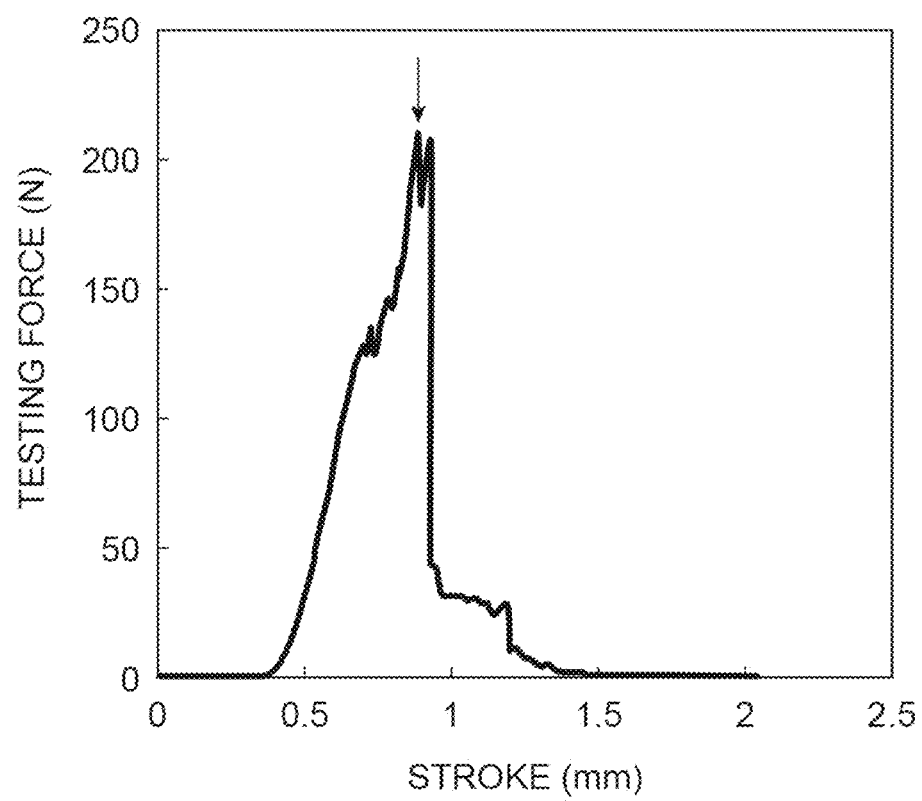
FIG. 11 is a graph showing a stress-displacement curve in a push-out test of Measurement Example B1.

The sintered body thus obtained was ground with sandpaper such that the zirconia-coated alumina rod would protrude through both surfaces of the cylinder, and a test specimen (sample for evaluation) having a size of 21 mm in diameter×3.4 mm in thickness was obtained. The interfacial strength obtained by the push-out test was 9.8 MPa. FIG. 11 is a graph showing a stress-displacement curve in the push-out test of Measurement Example B1. The arrow in FIG. 11 represents the maximum load (Pmax).

Measurement Example B2 (Measurement of Interfacial Strength)

A push-out test specimen (sample for evaluation) was obtained in the same manner as in Measurement Example B1, except that the surface coating treatment of the alumina rod was performed only once. The interfacial strength obtained by the push-out test was 7.3 MPa. From the present Measurement Example, it is understood that the interfacial strength is enhanced by repeating the surface coating treatment.

Measurement Example B3 (Measurement of Interfacial Strength)

0.00012 g of zirconium(IV) acetylacetonate ($Zr(CH_3COCHCOCH_3)_4$) was dissolved in 50 mL of ethanol, and an alumina rod having a total surface area of 0.094 $m^2$ was impregnated with the solution at room temperature for 24 hours. At this time, the coating ratio determined by Formula (1) was 50%. A push-out test specimen (sample for evaluation) was obtained in the same manner as in Measurement Example B1, except that the zirconia-coated alumina rod produced as such was used. The interfacial strength obtained by a push-out test was 7.6 MPa. From the present Measurement Example, it is understood that the interfacial strength is enhanced by increasing the coating ratio.

Measurement Example B4 (Measurement of Interfacial Strength)

0.5 g of lanthanum acetylacetonate dihydrate ($La(CH_3COCHCOCH_3)_3 \cdot 2H_2O$) was dissolved in 50 mL of ethanol, and an alumina rod having a total surface area of 0.094 $m^2$ was impregnated with the solution at room temperature for 24 hours. At this time, the amount was adjusted to be a large excess compared to the amount of addition required to obtain a coating ratio of 100% as determined by the above-described Formula (1). A push-out test specimen (sample for evaluation) was obtained in the same manner as in Measurement Example B1, except that the coated alumina rod produced as such was used. The interfacial strength obtained by a push-out test was 7.0 MPa.

Example B2

(Production of Ceramic Matrix Composite Material (CMC))

350 g of an approximately spherical-shaped α-alumina powder having an average particle size of 0.19 μm and 146 g of pure water were mixed in a ball mill, and an alumina slurry was obtained.

Next, the lanthanum oxide-coated continuous mullite fiber obtained in Example A4 was impregnated in the alumina mixed slurry and dried, and thereby a molded body having a size of 110 mm in width×110 mm in length×about 0.5 mm in thickness was obtained. The molded body was dried in air at 120° C. for one day and night and then heat-treated in air at 1100° C. for 2 hours, and thereby a CMC was obtained.

(Measurement of Bulk Tensile Strength)

The obtained CMC was processed into a size of 10 mm in width×100 mm in length×0.5 mm in thickness, and aluminum tabs were bonded to both ends to produce a tensile test specimen. The width and thickness of the tensile test specimen was measured using a micrometer, and the length of the test specimen was measured using vernier caliper. A tensile strength test was performed at a loading rate of 0.5 mm/min using a strength tester (manufactured by SHIMADZU CORPORATION, apparatus name: AG-X Plus) and tensile test jigs. The number of the test specimens for the tensile strength test was set to four, and the average value of the four specimens was designated as bulk tensile strength. The bulk tensile strength of the obtained CMC was 141 MPa.

Comparative Example B1

A CMC was obtained by a method similar to that used in Example B1, except that desizing-treated (heat treatment in air at 700° C.) continuous alumina fibers (alumina fiber cloth, manufactured by 3M Japan, Ltd., trade name: NEXTEL 610) were used (that is, continuous alumina fibers that were not coated with zirconia were used), instead of the zirconia-coated continuous alumina fibers. The fiber volume ratio of the CMC was 34.1% by volume, and the density of the CMC was 2.35 g/cm$^3$. The bulk tensile strength was 9 MPa, and this strength was lower than the strength of the CMC of Example B1.

Comparative Measurement Example B1
(Measurement of Interfacial Strength)

A push-out test specimen was obtained in the same manner as in Measurement Example B1, except that an alumina rod that had not been subjected to a surface coating treatment was used. The interfacial strength obtained by a push-out test was 13.6 MPa. From the present Measurement Example, it is speculated that with regard to the CMC of Comparative Example B1, fracture occurred due to strong adhesion between the continuous ceramic fibers and the ceramic matrix.

Comparative Example B2

A CMC was obtained by a method similar to that used in Example B2, except that desizing-treated (heat treatment in air at 700° C.) continuous mullite fibers (mullite fiber cloth, manufactured by 3M Japan, Ltd., trade name: NEXTEL 720) were used (that is, continuous mullite fibers that were not coated with lanthanum oxide were used), instead of the lanthanum oxide-coated continuous mullite fibers. The bulk tensile strength was 107 MPa, and this strength was lower than the strength of the CMC of Example B2.

As described above, with regard to the CMC of Example B1 having a coating layer-bonded continuous ceramic fiber and the CMC of Comparative Example B1 having a continuous ceramic fiber that did not have a coating layer on the surface, it was found that the CMC of Example B1 has superior strength, from a comparison between Measurement Example B1 and Comparative Measurement Example B1. Furthermore, with regard to the CMC of Example B2 having a coating layer-bonded continuous ceramic fiber and the CMC of Comparative Example B2 having a continuous ceramic fiber that did not have a coating layer on the surface, it was found that the CMC of Example B1 had superior strength. From these results, it was verified that the coating layer-bonded continuous ceramic fiber of the present invention is suitable for the production of a ceramic matrix composite material having sufficiently high strength.

INDUSTRIAL APPLICABILITY

The coating layer-bonded continuous ceramic fiber of the present invention does not undergo aggregation between the metal compounds during the coating of the surface of the continuous ceramic fiber, and therefore, the continuous ceramic fiber can be utilized as a CMC having high damage tolerance such as tensile strength. Furthermore, since the coating layer-bonded continuous ceramic fiber of the present invention can be produced by impregnating a continuous ceramic fiber with a solvent including a metal acetylacetonate complex, a coating treatment can be carried out conveniently with a two-dimensional cloth-like woven fabric as well as with a woven fabric or non-woven fabric having a three-dimensional complicated shape, and thus the coating layer-bonded continuous ceramic fiber can be industrially widely utilized.

REFERENCE SIGNS LIST

1: strength tester, 2: indenter, 3: surface-coated alumina rod, 4: ceramic matrix, 5: sample for evaluation, 6: fixing base, 10: interfacial strength analyzer.

The invention claimed is:

1. A coating layer-bonded continuous ceramic fiber comprising a continuous ceramic fiber having a coating layer of a metal compound with a thickness of 7 nm or less on the surface.

2. The coating layer-bonded continuous ceramic fiber according to claim 1, wherein the metal compound is at least any one of a zirconium compound or a lanthanum compound.

3. The coating layer-bonded continuous ceramic fiber according to claim 1, wherein the metal compound is zirconia or lanthanum oxide.

4. The coating layer-bonded continuous ceramic fiber according to claim 1, wherein the continuous ceramic fiber is at least any one of a continuous alumina fiber or a continuous mullite fiber.

5. A ceramic matrix composite material comprising the coating layer-bonded continuous ceramic fiber according to claim 1.

6. The ceramic matrix composite material according to claim 5, wherein an interfacial strength is 10 MPa or less.

7. A method for producing the coating layer-bonded continuous ceramic fiber according to claim 1, the method comprising:
    impregnating a continuous ceramic fiber with a solution including a metal acetylacetonate complex; and
    heat-treating the continuous ceramic fiber after impregnation.

8. A method for producing a ceramic matrix composite material, the method comprising compositing the coating layer-bonded continuous ceramic fiber according to claim 1 with a ceramic matrix.

\* \* \* \* \*